United States Patent Office 3,544,174
Patented Dec. 1, 1970

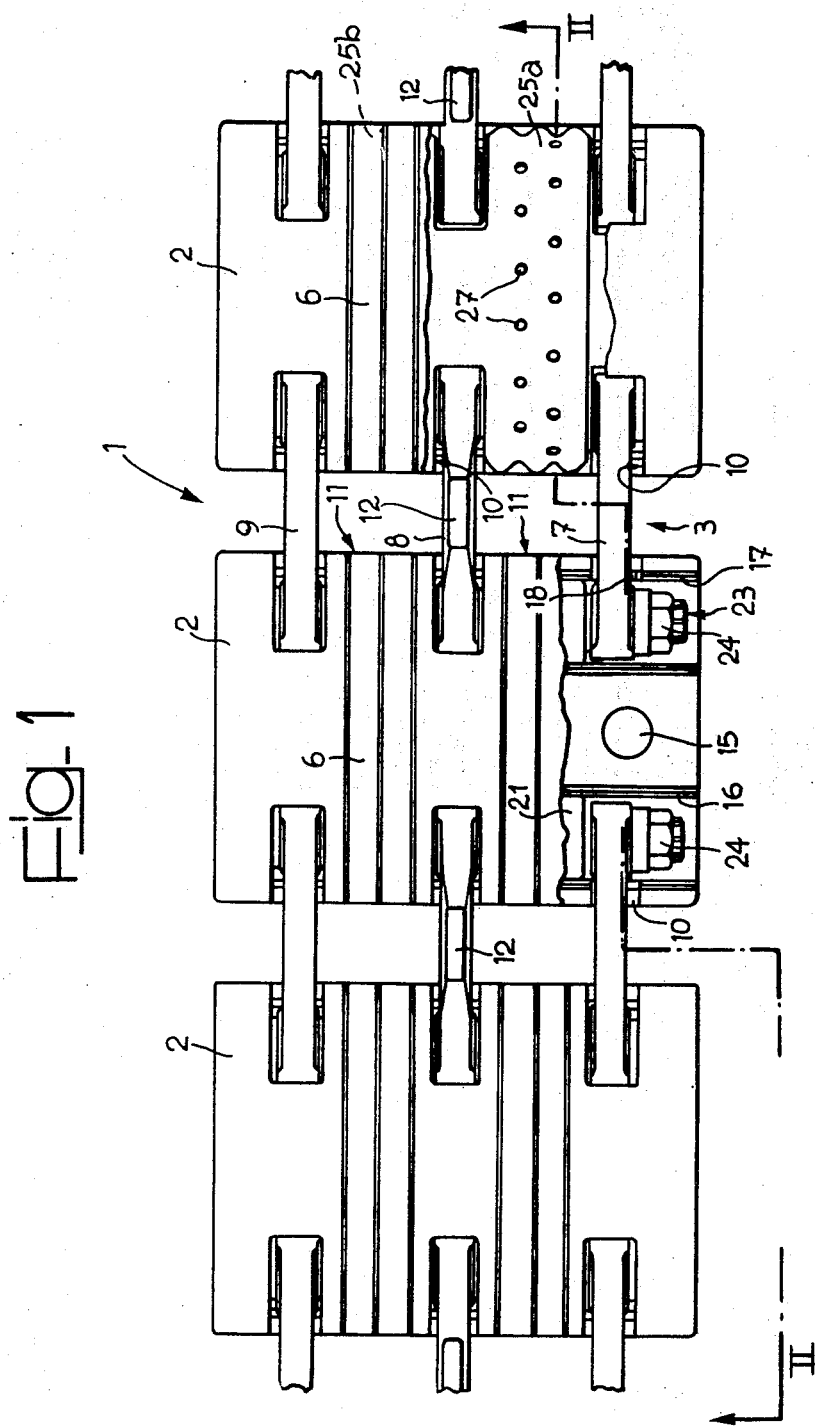

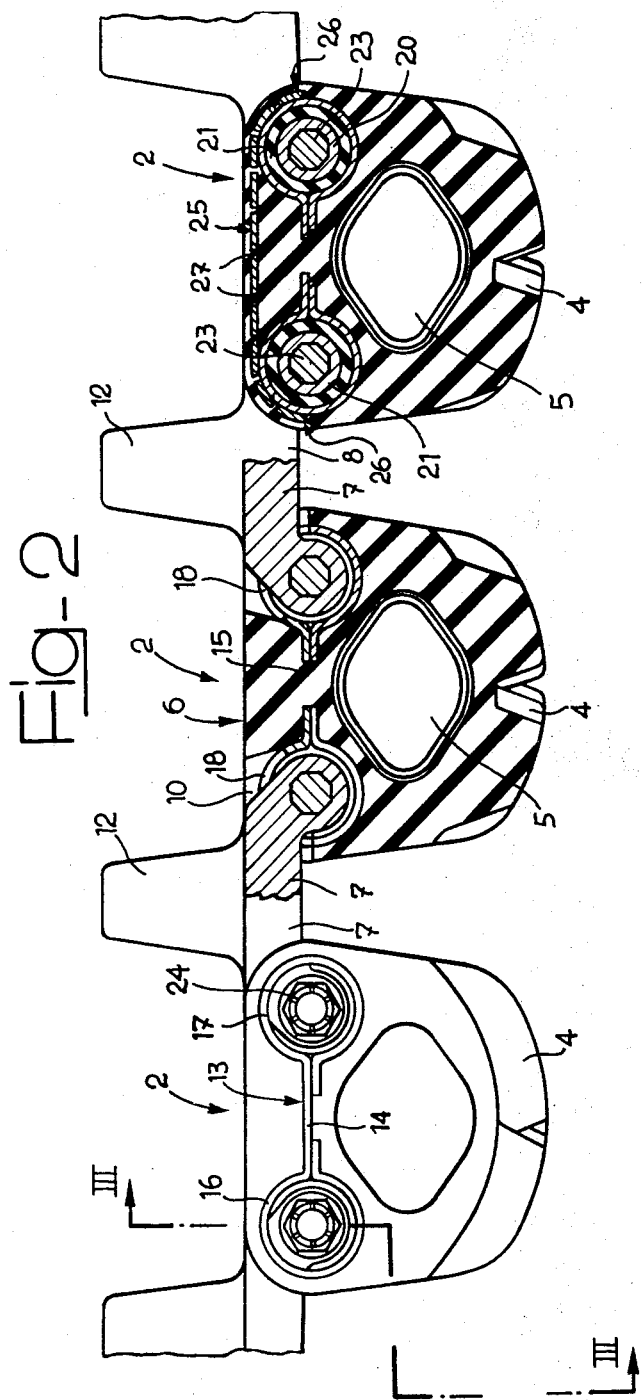

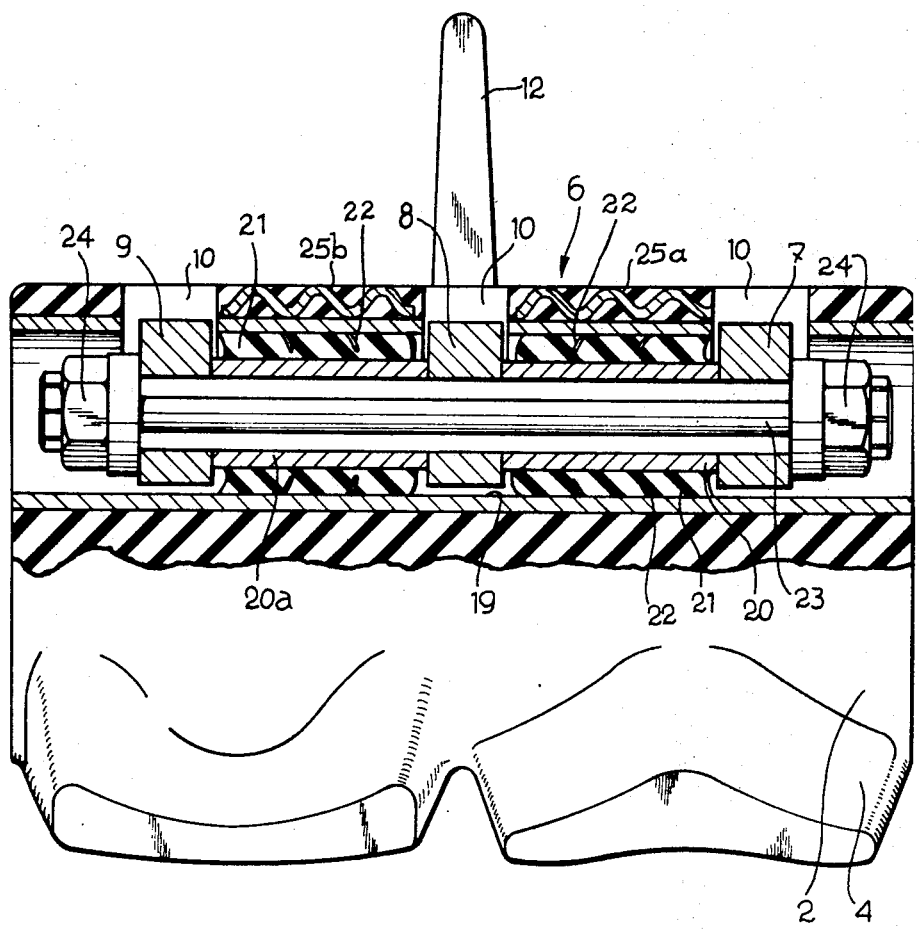

3,544,174
ENDLESS TRACKS HAVING PNEUMATIC TRACK ELEMENTS
Dante Giacosa, Turin, Italy, assignor to Fiat Societa per Azioni, Turin, Italy, an Italian joint-stock company
Filed Sept. 12, 1968, Ser. No. 759,264
Claims priority, application Italy, Sept. 21, 1967, 53,086/67
Int. Cl. B62d 55/24
U.S. Cl. 305—34
2 Claims

ABSTRACT OF THE DISCLOSURE

The track elements of an endless track are formed of resilient material. A metal frame embedded in the element subdivides it into a portion engaging the wheels of the track vehicle and a ground-engaging portion. The wheel-engaging portion incorporates corrugated sheet metal reinforcing, with the corrugations extending longitudinally, and with turned-over ends. The ground-engaging portion includes a pneumatic cushion. The ends of the metal frame are bent to tubular form and carry resilient bushes receiving pins that are attached to the links interconnecting the track elements. Certain links have a tooth to engage with the driving wheels.

---

This invention relates to endless tracks composed of resilient track elements interconnected by links.

In known resilient track elements there is wear of the resilient material both on the side engaging the ground and on the opposite side, where the track element engages the driving wheels of the track vehicle. The material in the wheel-engaging side is subject to various forces which distort it and may lead to premature breakdown. It is, however, highly desirable to have a body of resilient material on the wheel-engaging side to reduce noisiness of the track in operation.

An object of the invention is to provide a track in which the material on the wheel-engaging side is reinforced in such a way as to resist wear. The reinforcing sheet has turned-over end regions covering the tubular portions of the metal frame.

With this construction, the reinforcing sheet and the material in which it is embedded can undergo a relatively harmless transverse elastic deformation when the track element is under compression by engagement with the wheels. Longitudinal extension, which would tend to lead to bulges of resilient material which might be caught up and pinched by the teeth of the wheels, is avoided.

The reinforcing sheet preferably has turned-over edges which cover the transverse tubular portions of the metal frame. The bent-over edges further resist deformation of the resilient material when engaged by the driving wheels and so lead to a further reduction in wear.

The invention will be more clearly understood from the following description referring by way of example to the accompanying drawings wherein:

FIG. 1 is a part sectional plan view of part of a track according to the invention;

FIG. 2 is a cross-section view on line II—II of FIG. 1, and

FIG. 3 is a cross-sectional view on line III—III of FIG. 2.

In the drawings, 1 generally denotes part of an endless track composed of pneumatic track elements 2 and interconnected by sets of links 3. The pneumatic track elements 2 are of the type comprising a ground-engaging tread 4, an internal chamber 5 for containing gas under pressure and a rolling surface 6 opposite the tread 4, adapted to come into contact with the rolling surfaces of the driving and road wheels.

Each set of interconnecting links 3 for contiguous pneumatic track elements 2 comprises three link arms 7, 8, 9 having their opposite ends provided with respective eyes having bores of polygonal cross-sectional profile which are received in corresponding recesses 10 formed in the track elements 2.

The link arms 7, 8, 9 extend over a length such as to space the pneumatic track elements 2 by an extent corresponding to the pitch of the teeth in the driving wheels. When the wheels are rolling over the track said teeth engage transverse end surfaces 11 of the elements 2 which are substantially perpendicular to the surface 6 in order to assist rolling of the wheels over the track.

At least one of the link arms composing each link set is provided with an upstanding abutment tooth 12 adapted to co-operate with corresponding abutment surfaces on the wheels for guiding and retaining the wheels rolling over the track. In the embodiment shown the tooth 12 is carried by the central link arm 8, abutment surfaces being provided at the middle plane of each wheel.

It will, however, be understood that, in accordance with the various requirements in use, two or more of the interconnecting link arms of each link set can be provided with abutment teeth cooperating with corresponding abutment surfaces on the wheels.

Hinge means are provided for articulation of the ends of the link arms in the corresponding recesses 10 in the pneumatic elements 2. Thus each track element 2 includes a metal frame incorporated in the resilient material (rubber) of the pneumatic track element 2 and comprising a planar metal plate 13 in which openings 15 are bored in order to improve the bonding of the resilient material to the plate 13 and to facilitate moulding of the element 2.

The opposite ends of each metal plate 13 are turned-over in a manner known per se in order to form parallel tubular portions 16, 17 extending over the entire width of the respective element 2. The walls of the tubular portions 16, 17 are formed with openings 18 coinciding with the cavities 10 in the respective element 2.

Sleeves 20, 20a (FIG. 3) having cylindrical outer surfaces and internal bores of polygonal cross-sectional profile are arranged within the bore 19 of each respective tubular portion 16, 17. The said cylindrical outer surface of each sleeve 20, 20a is smaller in diameter than the respective bore 19 in order to define an annular space which accommodates two bushes 21 of resilient material. The bushes 21, which are formed with radial notches 22 in their external surfaces, are forced axially into the respective bore 19 to create a radial pre-stress in each bush 21, maintaining the sleeves 20, 20a resiliently and concentrically within the respective tubular portion 16, 17. Strains in the resilient material of the bushes 21 on rotation of the sleeves 20, 20a with respect to the tubular portions 16, 17 are thereby avoided.

The ends of the link arms 7, 8 and 9 are received in the recesses 10 and respective pins 23, having polygonal cross-sectional profiles matching the internal cross-sectional profiles of the sleeves 20, 20a, pass through the sleeves 20, 20a and the respective eyes in the arms 7, 8 and 9. The ends of the pins 23 are provided with externally screw-threaded portions on which respective clamping nuts 24 (FIG. 3) fit to clamp the link arms 7, 8, 9 and the sleeves 20, 20a together.

Moreover, according to the invention, each pneumatic track element 2 incorporates a metal reinforcing member 25 secured to the respective metal plate 13 at the rolling surface 6, more particularly at the regions of said surface 6 which are engaged by the rolling surfaces of the vehicle road wheels and by the inter-tooth surfaces of the driving sprocket wheels.

The reinforcing member 25 comprises a longitudinally corrugated sheet metal plate having two portions 25a and 25b which are symmetrically arranged in the surface 6 on opposite sides of the central link arm 8, that is, on opposite sides of a plane passing through the teeth 12. The plate portions 25a and 25b are formed with holes 27 (FIG. 1) in order to improve their attachment to the resilient material of the respective pneumatic track element 2 and to facilitate moulding of the respective element. With this construction the wheel-engaging portion of the track element can undergo transverse deformation when the track element is compressed in use under a wheel, bulging occurring along the sides of the element. Longitudinal extension or bulging is avoided. Each plate portion 25a, 25b has turned-over end regions 26 covering the tubular portions 16, 17 and adapted to prevent excessive deformations of the resilient material (rubber) of which the pneumatic track element 2 is made.

I claim:

1. An endless track adapted to be driven by the driving wheels of a track vehicle, the track comprising a plurality of track elements interconnected by link arms, at least some of which link arms are formed with an upstanding tooth to co-operate with the driving wheels, each track element comprising a resilient body in which is embedded a metal frame dividing the resilient body into a wheel-engaging portion and a ground-engaging portion, the metal frame having at each end a transversely extending tubular portion, a resilient bush being fitted within each such tubular portion and pin means being received within each such bush and attached to link arms that connect the element to a neighbouring element in the track, the ground-engaging portion of the resilient body including an internal cavity containing gas under pressure to form a pneumatic cushion, and the wheel-engaging portion having embedded therein metal reinforcing means in the form of corrugated metal sheet whose corrugations extend longitudinally in the track element.

2. The track of claim 1 in which the reinforcing sheet has turned-over end regions covering the tubular portions of the metal frame.

References Cited

UNITED STATES PATENTS

| | | | |
|---|---|---|---|
| 2,012,958 | 9/1935 | Colby | 305—42 X |
| 2,306,577 | 12/1942 | Walker | 305—34 |
| 2,359,586 | 10/1944 | Sayler | 305—34 |
| 2,687,923 | 8/1954 | Proske | 305—36 |
| 3,339,987 | 9/1967 | Korner | 305—36 |

RICHARD J. JOHNSON, Primary Examiner

U.S. Cl. X.R.

305—38